United States Patent
Jiang et al.

(10) Patent No.: US 7,885,658 B2
(45) Date of Patent: Feb. 8, 2011

(54) METHOD FOR DETECTING REVERSE LINK COLLISIONS ON AN AIR INTERFACE

(75) Inventors: Frances Jiang, Whippany, NJ (US); Danny Chick-Leung Lui, Belle Mead, NJ (US); Lily H. Zhu, Parsippany, NJ (US); Jialin Zou, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 326 days.

(21) Appl. No.: 11/014,288

(22) Filed: Dec. 16, 2004

(65) Prior Publication Data

US 2006/0135161 A1    Jun. 22, 2006

(51) Int. Cl.
*H04W 36/00* (2009.01)

(52) U.S. Cl. .................. 455/437; 455/419; 455/435.1; 455/450; 455/445; 455/552.1; 370/335; 370/342

(58) Field of Classification Search .............. 455/450, 455/419, 551, 552.1, 410, 411, 433, 435.1, 455/436, 550.1; 370/335, 342
See application file for complete search history.

(56) References Cited

U.S. PATENT DOCUMENTS

| | | | | |
|---|---|---|---|---|
| 5,608,781 A | * | 3/1997 | Seiderman | 455/410 |
| 5,640,679 A | * | 6/1997 | Lundqvist et al. | 455/525 |
| 6,144,653 A | * | 11/2000 | Persson et al. | 370/337 |
| 6,374,122 B1 | * | 4/2002 | Leung | 455/551 |
| 2004/0037250 A1 | * | 2/2004 | Refai | 370/335 |
| 2005/0070249 A1 | * | 3/2005 | Lee | 455/410 |
| 2005/0186973 A1 | * | 8/2005 | Gaal et al. | 455/458 |
| 2006/0073834 A1 | * | 4/2006 | Thorson | 455/450 |

OTHER PUBLICATIONS

International European Search Report EP 05 25 7615 dated Apr. 18, 2006.

* cited by examiner

*Primary Examiner*—Nghi H Ly
*Assistant Examiner*—Inder P Mehra
(74) *Attorney, Agent, or Firm*—Williams, Morgan & Amerson, P.C.

(57) ABSTRACT

The present invention provides a method of wireless telecommunication. The method includes accessing information indicative of a first mobile unit in response to a signal from the first mobile unit, accessing information indicative of at least one second mobile unit, and comparing the information indicative of the first and second mobile units. The method also includes establishing a call connection with the first mobile unit based on the comparison of the information indicative of the first and second mobile units.

13 Claims, 5 Drawing Sheets

METHOD FOR DETECTING REVERSE LINK COLLISIONS ON AN AIR INTERFACE

BACKGROUND OF THE INVENTION

1. Field of the Invention

This invention relates generally to telecommunication systems, and, more particularly, to wireless telecommunication systems.

2. Description of the Related Art

The coverage area of a wireless communication system is typically divided into a number of cells, which may be grouped into one or more networks. Mobile units located in each cell may access the wireless communications system by establishing a wireless communication link, often referred to as an air interface, with a base station associated with the cell. The mobile units may include devices such as mobile telephones, personal data assistants, Global Positioning System devices, desktop or laptop computers, and the like. For example, a mobile telephone may initiate communication with a base station by providing a signal on an access channel. The base station may then use the received access channel signal to establish the wireless communication link between the mobile unit and the base station on a separate traffic channel. The mobile unit and the base station may then exchange messages over the air interface using the traffic channel.

At any given time, each base station may be expected to maintain concurrent wireless communication links with numerous mobile units. To reduce interference between the concurrent wireless communication links, the base station and the mobile units in the wireless communication system modulate signals transmitted on the assigned traffic channels using a predetermined code that uniquely identifies the mobile unit. For example, in a wireless communication system operating according to the CDMA 2000 standard, a public long code mask may be used to differentiate reverse link transmissions, i.e. from the mobile unit to the base station, over different traffic channels. The public long code mask is typically a 42-bit-long mask including two bits that indicate the type of long code mask (e.g. public or private), an additional eight bits that provide signaling information such as the method used to form the long code mask, and a 32-bit electronic serial number (often referred to using the acronym ESN) assigned to the mobile unit.

The proliferation of various types of mobile units has begun to exhaust the supply of 32-bit electronic serial numbers. To accommodate the growing number of mobile units, many practitioners have proposed replacing the 32-bit electronic serial number with a 56-bit mobile equipment identifier (often referred to using the acronym MEID: Mobile Equipment IDentifier). Under this proposal, a 56-bit mobile equipment identifier will be assigned to each mobile unit. For example, a unique 56-bit mobile equipment identifier may be incorporated into the hardware and/or software of each mobile unit. The 56-bit mobile equipment identifier, or another unique bit sequence formed based on the 56-bit mobile equipment identifier, may then be used by base stations to uniquely identify each mobile unit.

However, as use of the 56-bit mobile equipment identifier is phased in over time, many legacy systems may continue to use the public long code masks generated using the 32-bit electronic serial number. For example, a legacy base station may generate a public long code mask using the 32-bit electronic serial number. Accordingly, protocols that incorporate the 56-bit mobile equipment identifier typically provide for a pseudo-electronic serial number (sometimes referred to as a pseudo-ESN). For example, mobile units that operate according to the IS-2000 Revision-D standard protocol are able to form a 32-bit pseudo-ESN using a hashing algorithm to generate a 24-bit number and then combining this number with a leading 8-bit fixed pattern 10000000, which is sometimes referred to as a manufacture code. The pseudo-ESN can be used by a base station to distinguish Revision-D mobile units from pre-Revision-D mobile units using the 8-bit fixed pattern.

A pseudo-ESN may also be used to generate a public long code mask that may be used to identify the mobile unit to a legacy base station. For example, the pseudo-ESN may be used to generate a public long code mask that may be used to identify the mobile unit to a network that operates according to IS-2000 protocol revisions having a protocol revision number less than 11. However, the pseudo-ESNs, as well as the public long code masks generated using the pseudo-ESNs, may not uniquely identify each mobile unit to the base station. An air interface collision may therefore occur when two mobile units in the same sector (or in neighboring sectors) attempt to communicate with a base station on different traffic channels within the same carrier using the same public long code mask generated from a pseudo-ESN.

Air interface collisions may increase the frame error rate (or bit error rate) on the reverse link. The increased frame error rate may also cause the power control system in the base station to raise the transmission powers used in the mobile in an attempt to decrease the frame error rate. Since the frame error rate is caused, at least in part, by the air interface collision, raising the transmission power of the mobile units may exacerbate the effects of the air interface collision and increase the frame error rate. Thus, attempting to address the errors caused by the air interface collision by raising the transmission power may lead to a feedback loop that forces the mobile units and/or base stations to transmit at their maximum transmission power. Increasing the transmission power, potentially to the maximum transmission power available to the mobile units and/or base stations, in this manner may decrease overall system capacity.

Air interface collisions may also create crosstalk on the reverse link, particularly if the signal transmitted on the traffic channel by one of the mobile stations is much stronger than the signal transmitted by the other mobile station. Crosstalk may also result in a real or perceived reduction in call privacy. In some cases, air interface collisions may also result in dropped calls, a decrease in user-perceived quality of service, and other undesirable effects.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for wireless telecommunication. The method includes accessing information indicative of a first mobile unit in response to a signal from the first mobile unit, accessing information indicative of at least one second mobile unit, and comparing the information indicative of the first and second mobile units. The method also includes establishing a call connection with the first mobile unit based on the comparison of the information indicative of the first and second mobile units.

BRIEF DESCRIPTION OF THE DRAWINGS

The invention may be understood by reference to the following description taken in conjunction with the accompanying drawings, in which like reference numerals identify like elements, and in which.

Figure 1:
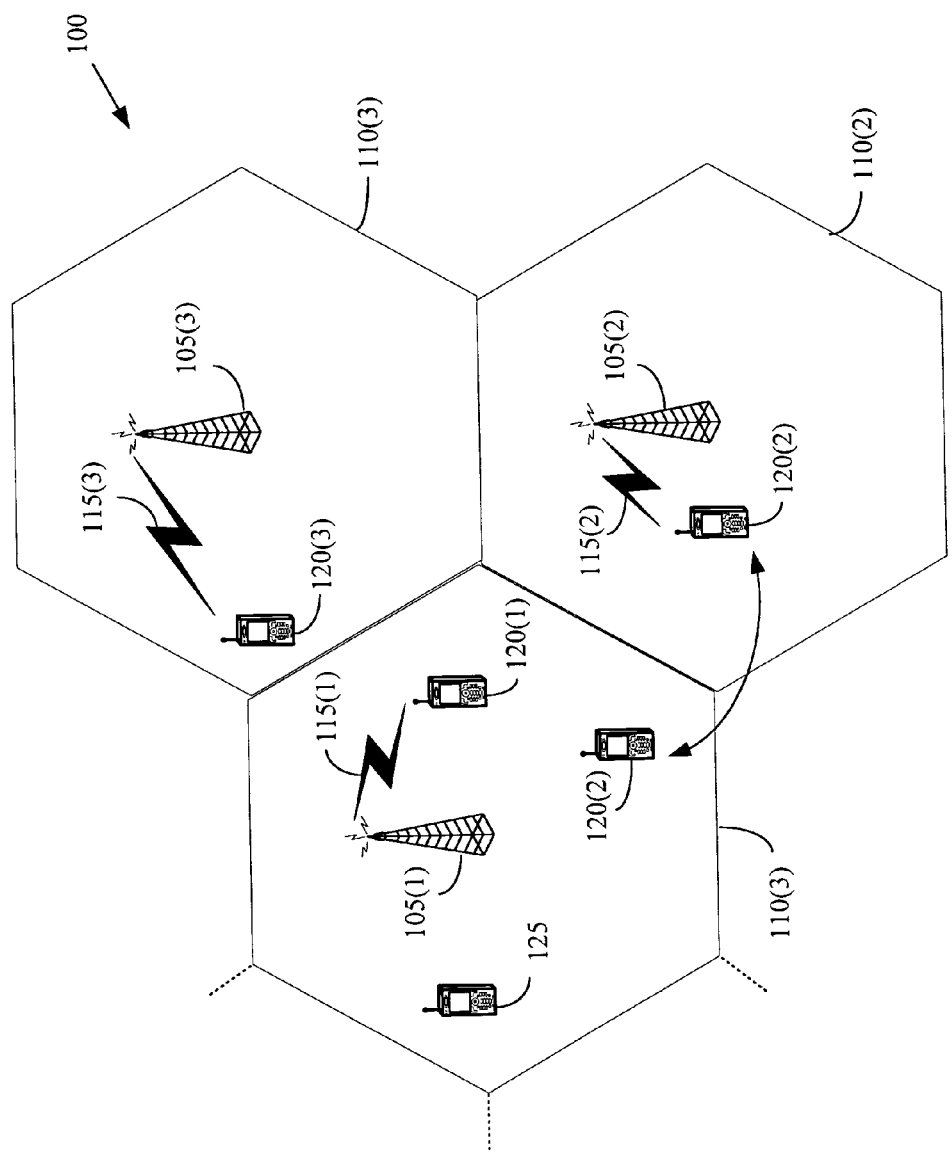
FIG. 1 shows a wireless telecommunication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, a wireless telecommunication system 100 is shown. The illustrated embodiment of the wireless telecommunication system 100 includes a plurality of base stations 105(1-3) that provide wireless telecommunication services to an associated geographic area 110(1-3), commonly referred to as cells 110(1-3) or sectors. Although the cells 110 are depicted in FIG. 1 as non-overlapping hexagons, persons of ordinary skill in the art should appreciate that this is an idealization used for illustrative purposes and that in practice the cells 110(1-3) may have a variety of irregular shapes that may or may not overlap with neighboring cells 110(1-3). Persons of ordinary skill in the art should also appreciate that techniques for providing wireless telecommunication services are well known and, in the interest of clarity, only those aspects of providing wireless telecommunication services relevant to the present invention will be discussed herein.

In operation, the base stations 105(1-3) may establish one or more wireless telecommunication links 115(1-3), commonly referred to as air interfaces 115(1-3), with one or more mobile units 120(1-3). The air interfaces 115 (1-3) may be used to transmit various control and/or data signals such as pilot signals, paging signals, page response signals, data packets, voice packets, and the like. The air interfaces 115 (1-3) may operate according to one or more protocols including, but not limited to, a Universal Mobile Telephone System (UMTS) protocol, a Code Division Multiple Access (CDMA 2000) protocol, a Global System for Mobile communications (GSM) protocol, and the like. In various alternative embodiments, the air interfaces 115(1-3) may also operate according to wireless protocols such as a Bluetooth protocol, an 802.11 protocol, and the like.

Each mobile unit 120(1-3) is associated with information that uniquely identifies the mobile unit 120(1-3). In one embodiment, the mobile units 120(1-3) are each associated with a unique 56-bit mobile equipment identifier (often referred to using the acronym MEID: Mobile Equipment IDentifier). In various alternative embodiments, the 56-bit mobile equipment identifier may be incorporated into the hardware and/or software of each mobile unit 120(1-3). The mobile units 120(1-3) may provide the 56-bit mobile equipment identifier, or another unique bit sequence formed based on the 56-bit mobile equipment identifier, to the base stations 105(1-3) to uniquely identify each mobile unit 120(1-3).

In the illustrated embodiment, the base station 105(1) is a legacy base station. As used herein, the term "legacy" refers to systems that expect to receive a 32-bit electronic serial number, or some permutation of the 32-bit electronic serial number, from the mobile units 120(1-3). Legacy systems also assume that the 32-bit electronic serial number, or the expected permutation thereof, uniquely identifies the mobile units 120(1-3). For example, the legacy base station 105(1) expects to receive a public long code mask formed using a 32-bit electronic serial number provided by the mobile unit 120(1) and also expects the public long code mask to uniquely identify the mobile unit 120(1). Examples of legacy systems include wireless telecommunication systems that operate according to IS-2000 protocol revisions having a protocol revision number less than 11, wireless telecommunication systems that operate according to versions of the IS-2000 standard protocol prior to Revision-D, and the like.

Accordingly, the mobile units 120(1-3) may form and provide a pseudo-electronic serial number (sometimes referred to as a pseudo-ESN) based on the 56-bit mobile equipment identifier. For example, mobile units 120(1-3) that operate according to the IS-2000 Revision-D standard protocol are able to form a 32-bit pseudo-ESN using a hashing algorithm to generate a 24-bit number and then combining this number with a leading 8-bit fixed pattern, which is sometimes referred to as a manufacture code. For example, the manufacture code may be set to 10000000.

Figure 2:
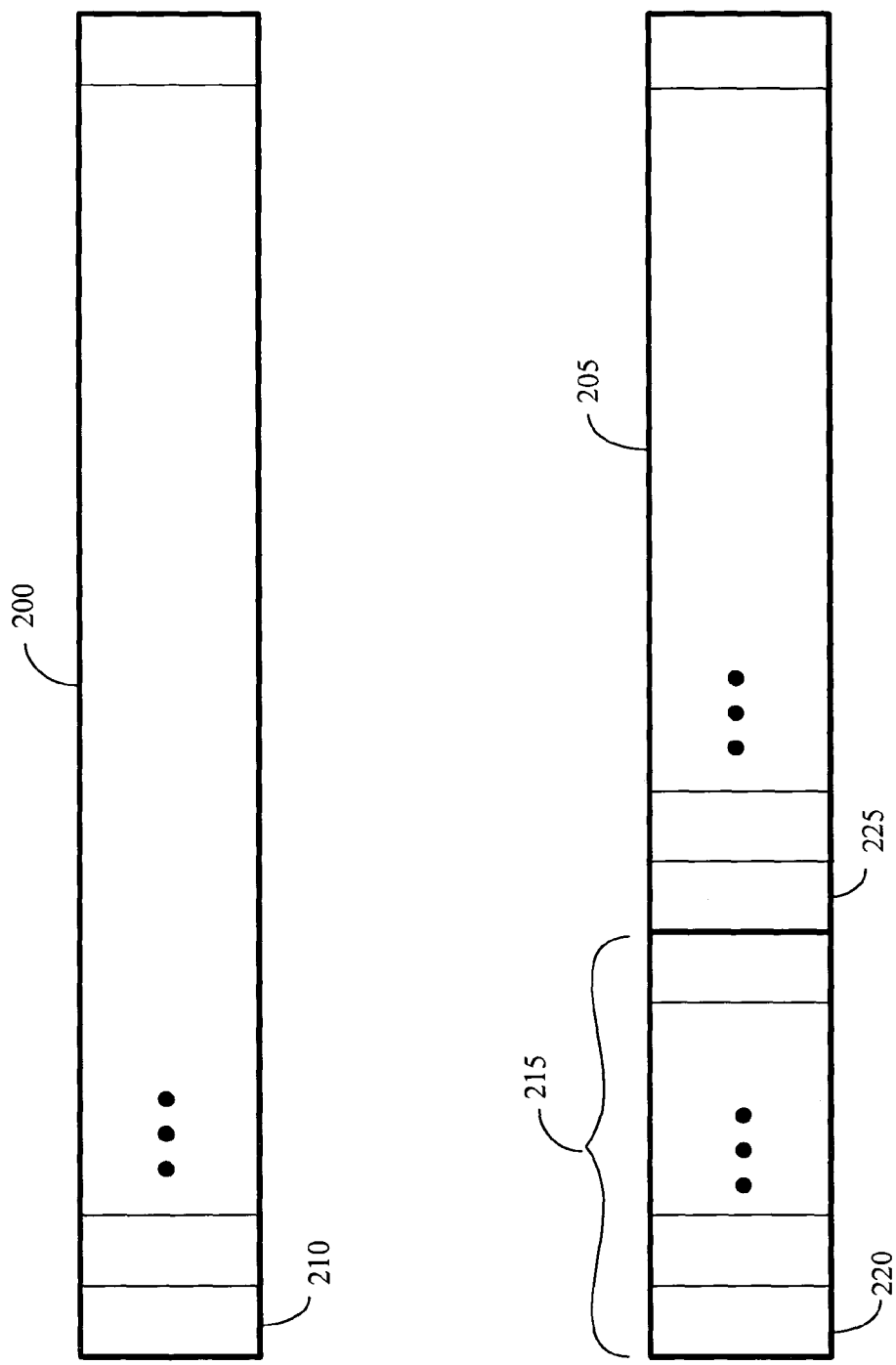
FIG. 2 conceptually illustrates one embodiment of a 32-bit electronic serial number and one embodiment of a 32-bit pseudo-electronic serial number.

FIG. 2 conceptually illustrates one embodiment of a 32-bit electronic serial number 200 and one embodiment of a 32-bit pseudo-electronic serial number 205. The electronic serial number 200 includes 32 bits 210, which may be set to "1" or "0" to identify an associated mobile unit. For example, the electronic serial number 200 may be used to generate a public long code mask that may be used to identify a mobile unit to a legacy base station. The pseudo-electronic serial number 205 includes a plurality of identifying bits 215 and a leading fixed pattern 220 of a plurality of fixed bits 225. For example, the pseudo-electronic serial number 205 includes 24 identifying bits 215 and a leading fixed pattern 220 of eight fixed bits 225. The pseudo-electronic serial number 205 may also be used to generate a public long code mask that may be used to identify the mobile unit to a legacy base station. For example, the pseudo-electronic serial number 205 may be used to generate a public long code mask that may be used to identify a mobile unit to a network that operates according to IS-2000 protocol revisions having a protocol revision number less than 11. However, the pseudo-electronic serial number 205, as well as the public long code masks generated using the pseudo-electronic serial number 205, may not uniquely identify each mobile unit to the network. Thus, air interface collisions may occur when two mobile units in the same sector (or in neighboring sectors) attempt to communicate with a base station on different traffic channels within the same carrier using the same public long code mask generated from an identical pseudo-ESN. For example, air interface collisions may occur when two mobile units having identical pseudo-ESNs attempt to originate calls with a base station, respond to a page from a base station, during call handoff, and the like.

Referring back to FIG. 1, additional mobile units may provide signals to the base station 105(1) on a reverse link, such as origination signals, page response signals, handoff requests, and the like. In one embodiment, a mobile unit 125 in the cell 110(1) provides an origination signal indicating that the mobile unit 125 would like to establish a call connection with the base station 105(1). Alternatively, the mobile unit 125 may provide a response to a page signal broadcast by the base station 105(1). In another embodiment, the mobile unit 120(2) may move from the cell 110(2) to the cell 110(1). Accordingly, the base station 105(1) may receive a request to handoff a call connection associated with the mobile unit 120(2). As discussed above, the mobile units 125, 120(2) provide a pseudo-electronic serial number, or other identifying information, to the base station 105(1), which may use the identifying information to generate a public long code mask. Since the pseudo-electronic serial number provided to the base station 105(1) may not uniquely identify the mobile units 125, 120(2), the base station 105(1) is modified to detect and/or handle the potentially non-unique identifying information.

Figure 3:
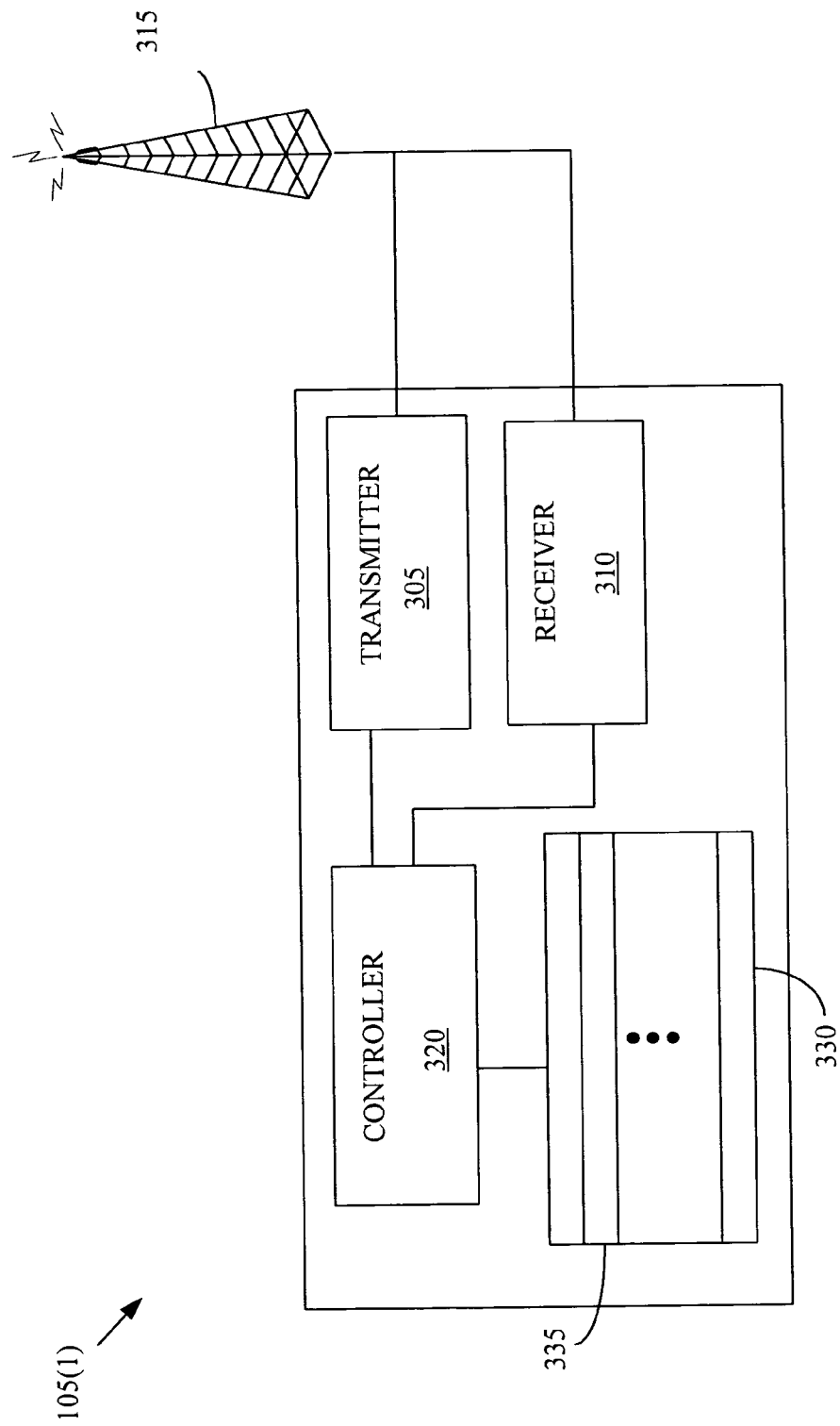
FIG. 3 conceptually illustrates one embodiment of a modified legacy base station that can detect and/or handle potentially non-unique identifying information that may be provided by non-legacy mobile units, in accordance with the present invention.

FIG. 3 conceptually illustrates one embodiment of a base station 105(1) that can detect and/or handle potentially non-unique identifying information that may be provided by mobile units. In the illustrated embodiment, the base station 105(1) includes the transmitter 305 and a receiver 310 that may be used to transmit and/or receive signals using an antenna 315, in a manner well known to persons of ordinary skill in the art. The transmitter 305 and the receiver 310 are coupled to a controller 320, which is coupled to a database 330 having a plurality of entries 335. In one embodiment, the entries 335 include information indicative of one or more mobile units having active call connections with the base station 105(1). However, the present invention is not limited to databases 330 including entries 335 corresponding to mobile units having active call stations with the base station 300. In alternative embodiments, the database 330 may include entries 335 corresponding to any desirable mobile units, such as mobile units having active call connections with neighboring base stations.

Figure 4:
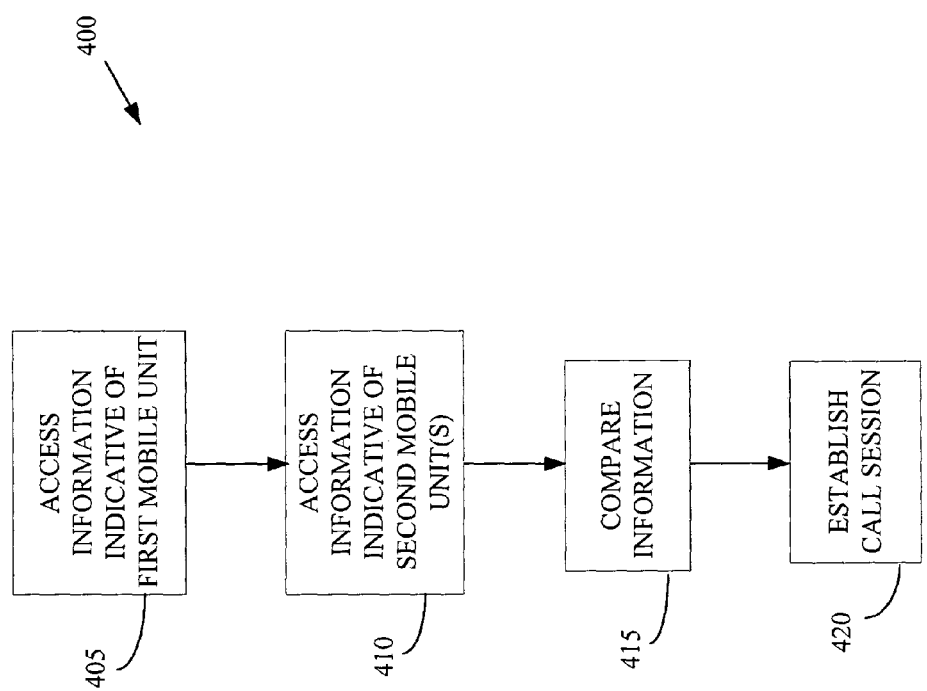
FIG. 4 conceptually illustrates a method of detecting and/or handling potentially non-unique identifying information, in accordance with the present invention.

FIG. 4 conceptually illustrates a method 400 of detecting and/or handling potentially non-unique identifying information. Referring now to FIGS. 1, 3, and 4, in the illustrated embodiment, the base station 105(1) can access (at 405) identifying information, such as the pseudo-electronic serial number or public long code mask, associated with the mobile units 125, 120(2) in response to receiving the origination signal, page response, handoff request, or other signal from the mobile unit 125, 120(2). The base station 105(1) can also access (at 410) information indicative of other mobile units associated with the base station 105(1). For example, the base station 105(1) may access the database 330 containing entries 335 having information indicative of mobile units 120(1) having active call connections with the base station 105(1). Active call connections in neighboring cells 110(2-3) may contribute to interference and/or crosstalk within the cell 110(1). Thus, in one embodiment, the database 330 may also include entries 335 having information indicative of mobile units in the neighboring cells 110(2-3). For example, the base station 105(1) may access information indicative of the mobile unit 120(3) in the database 330. In various alternative embodiments, the information indicative of the various mobile units 120(1-3), 125 stored in the database 330 may include an electronic serial number, a pseudo-electronic serial number, a public long code mask, and the like.

The base station 105(1) compares (at 415) the information indicative of the mobile units 125, 120(2) to the information indicative of the mobile units 120(1, 3) having active call connections. For example, the base station 105(1) may compare (at 415) a pseudo-electronic serial number provided by the mobile unit 125 to an electronic serial number provided by the mobile unit 120(1). The base station 105(1) then establishes (at 420) one or more call connections with the mobile units 125, 120(2) based on the comparison.

Figure 5:
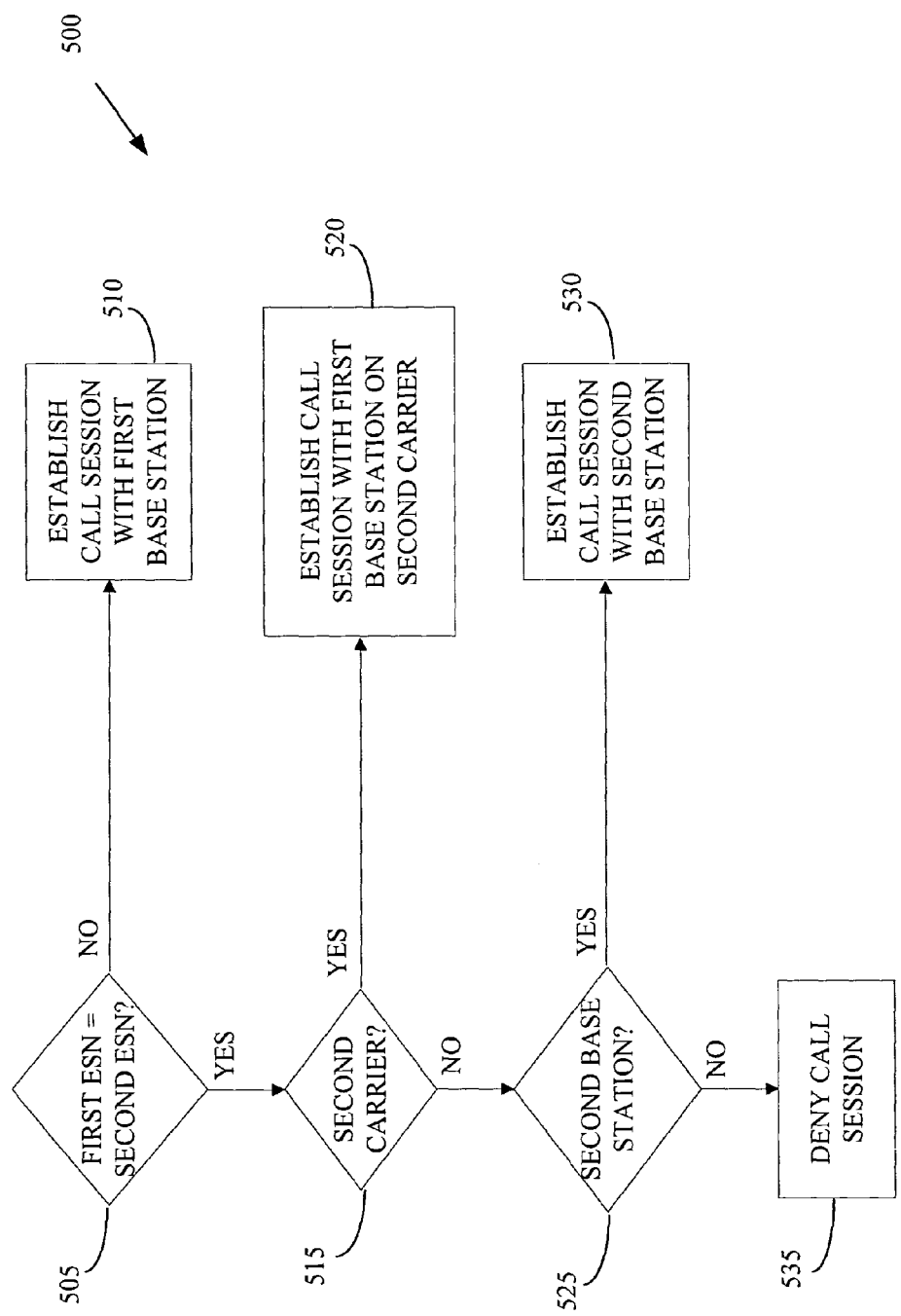
FIG. 5 conceptually illustrates one embodiment of a method for detecting potentially non-unique information identifying a first mobile unit and establishing a call connection associated with the first mobile unit, in accordance with the present invention.

FIG. 5 conceptually illustrates one embodiment of a method 500 for detecting a potentially non-unique identifier associated with a first mobile unit and establishing a call connection (or granting a handoff admission request) with the first mobile unit. In the illustrated embodiment, a first base station has access to electronic serial numbers associated with the first mobile unit and at least one second mobile unit. For example, the first mobile unit may provide the electronic serial number on an access channel and the electronic serial number(s) of the second mobile units may be stored in a database. One or more of the second mobile units may have active call connections established with the first base station on a first carrier frequency. As discussed above, the present invention is not limited to comparing electronic serial numbers and, in alternative embodiments, the information indicative of the first and/or second mobile units may include a pseudo-electronic serial number, a public long code mask, and the like.

The first base station compares (at 505) the electronic serial number associated with the first mobile unit to each of the electronic serial numbers associated with the at least one second mobile unit. If the electronic serial number associated with the first mobile unit is different from all of the electronic serial numbers associated with second mobile units, the first base station establishes (at 510) a call connection between the first mobile unit and the first base station.

If the first base station determines (at 505) that the first electronic serial number is the same as at least one of the second electronic serial numbers, indicating that a call connection between the first mobile unit and the first base station on the first carrier frequency may lead to an air interface collision, the first base station determines (at 515) whether or not a second carrier frequency is available. If a second carrier frequency is available, the first base station may establish (at 520) a call connection with the first mobile unit on the second carrier frequency. If the first base station determines (at 515) that a second carrier frequency, or other channel, is not available, the first base station may determine (at 525) whether or not a second base station is available to handle a call connection with the first mobile unit. If a second base station is available to handle a call connection with the first mobile unit, then a call connection may be established (at 530) between the second base station and the first mobile unit. However, if no additional base stations are available, the call connection requested by the first mobile unit may be denied (at 535).

Implementing one or more embodiments of the above invention may reduce air interface collisions, such as may be caused by using non-unique mobile unit identifiers in legacy systems. Embodiments of the invention described above may be implemented in software and/or hardware, or any combination thereof. Moreover, the implementations may be incorporated into existing legacy systems without upgrading the entire system to remove legacy equipment.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of communicating with at least a first mobile unit and at least a second mobile unit, comprising:
    receiving the signal from the first mobile unit at a first base station;
    accessing information indicative of the first mobile unit;
    accessing information indicative of said at least one second mobile unit;
    comparing the information indicative of the first and second mobile units; and
    establishing a call connection with the first mobile unit based on the comparison of the information indicative of the first and second mobile units, wherein the second mobile unit has an active call connection with the first base station, and wherein establishing a call connection comprises establishing a call connection between the first mobile unit and a second base station when a portion of the information indicative of the first mobile unit is the same as a portion of the information indicative of the second mobile unit.

2. The method of claim 1, wherein accessing the information indicative of the first mobile unit comprises accessing at least one of an electronic serial number and a pseudo-electronic serial number.

3. The method of claim 1, wherein accessing the information indicative of the first mobile unit in response to the signal from the first mobile unit comprises accessing the information indicative of the first mobile unit in response to at least one of an origination signal, a page response, and a handoff admission request.

4. The method of claim 1, wherein accessing the information indicative of the at least one second mobile unit comprises accessing at least one of an electronic serial number and a pseudo-electronic serial number.

5. The method of claim 1, wherein accessing the information indicative of the at least one second mobile unit comprises accessing information indicative of one or more second mobile units having active calls in a sector associated with the first mobile unit.

6. The method of claim 5, wherein accessing the information indicative of the at least one second mobile unit comprises accessing information indicative of one or more second mobile units having active calls in a sector neighboring the sector associated with the first mobile unit.

7. The method of claim 1, wherein accessing the information indicative of the second mobile unit comprises accessing a database including the information indicative of at least one second mobile unit.

8. The method of claim 1, wherein comparing the information indicative of the first and second mobile units comprises comparing at least one of an electronic serial number and a pseudo-electronic serial number associated with the first and second mobile units.

9. The method of claim 8, wherein comparing the information indicative of the first and second mobile units comprises determining whether the information indicative of the first and second mobile units is an electronic serial number or a pseudo-electronic serial number.

10. The method of claim 8, wherein comparing the information indicative of the first and second mobile units comprises determining whether the electronic serial number or the pseudo-electronic serial number associated with the first mobile unit is the same as the electronic serial number or the pseudo-electronic serial number associated with the second mobile unit.

11. The method of claim 1, wherein establishing a call connection comprises denying a call connection with the first mobile unit when a portion of the information indicative of the first mobile unit is the same as a portion of the information indicative of the second mobile unit.

12. The method of claim 1, wherein at least one of the information indicative of the first mobile unit and the information indicative of the second mobile unit comprises information indicative of a pseudo-electronic serial number formed by combining a fixed bit pattern with a number generated using a hashing algorithm.

13. The method of claim 1, wherein establishing the call connection with the first mobile unit comprises establishing, using the pseudo-electronic serial number, a call connection between the first base station and the first mobile unit when the comparison of the information indicative of the first and second mobile units indicates that the call connection avoids collision at the first base station with another call associated with the second mobile unit.

* * * * *